US012120699B2

(12) United States Patent
Hu et al.

(10) Patent No.: US 12,120,699 B2
(45) Date of Patent: Oct. 15, 2024

(54) BASE STATION-SIDE AND USER EQUIPMENT-SIDE APPARATUSES AND METHODS, AND WIRELESS COMMUNICATION SYSTEM

(71) Applicant: Sony Group Corporation, Tokyo (JP)

(72) Inventors: Bingshan Hu, Beijing (CN); Xin Guo, Beijing (CN); Chen Sun, Beijing (CN); Penshun Lu, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 57 days.

(21) Appl. No.: 17/553,803

(22) Filed: Dec. 17, 2021

(65) Prior Publication Data

US 2022/0110151 A1   Apr. 7, 2022

Related U.S. Application Data

(63) Continuation of application No. 15/769,769, filed as application No. PCT/CN2016/103023 on Oct. 24, 2016, now abandoned.

(30) Foreign Application Priority Data

Nov. 5, 2015   (CN) .......................... 201510745617.0

(51) Int. Cl.
*H04W 72/23* (2023.01)
*H04W 16/14* (2009.01)
(Continued)

(52) U.S. Cl.
CPC ........... *H04W 72/23* (2023.01); *H04W 16/14* (2013.01); *H04W 72/121* (2013.01);
(Continued)

(58) Field of Classification Search
None
See application file for complete search history.

(56) References Cited

U.S. PATENT DOCUMENTS

2007/0286122 A1* 12/2007 Fonseca ............. H04W 72/542
                                                        370/329
2008/0146156 A1*  6/2008 Makhlouf ......... H04W 74/0808
                                                        455/63.1
(Continued)

FOREIGN PATENT DOCUMENTS

CN    102149204 A    8/2011
CN    102447549 A    5/2012
(Continued)

OTHER PUBLICATIONS

International Search Report issued Jan. 20, 2017 in PCT/CN2016/103023 filed Oct. 24, 2016.
(Continued)

*Primary Examiner* — Faruk Hamza
*Assistant Examiner* — Cassandra L Decker
(74) *Attorney, Agent, or Firm* — XSENSUS LLP

(57) ABSTRACT

Base station-side and user equipment-side apparatuses and methods, and a wireless communication system, for use in wireless communication. The base station-side apparatus for use in wireless communication includes: a setting unit, configured to set different priority levels for using uplink transmission resources on unauthorized band with respect to a plurality of user equipment; and a generating unit, configured to generate an uplink scheduling authorization for using one same uplink transmission resource on the unauthorized band with respect to each user equipment, wherein each uplink scheduling authorization includes information about a priority level of the corresponding user equipment.

7 Claims, 12 Drawing Sheets

(51) Int. Cl.
  *H04W 72/121*  (2023.01)
  *H04W 72/1268* (2023.01)
  *H04W 72/52*  (2023.01)
  *H04W 72/543*  (2023.01)
  *H04W 72/566*  (2023.01)
  *H04W 74/08*  (2024.01)

(52) U.S. Cl.
  CPC ..... *H04W 72/1268* (2013.01); *H04W 72/566* (2023.01); *H04W 72/569* (2023.01); *H04W 74/08* (2013.01); *H04W 72/52* (2023.01); *H04W 72/543* (2023.01)

(56) References Cited

U.S. PATENT DOCUMENTS

| | | |
|---|---|---|
| 2009/0213805 A1 | 8/2009 | Zhang et al. |
| 2009/0225712 A1 | 9/2009 | Stamoulis et al. |
| 2010/0246456 A1 | 9/2010 | Suo et al. |
| 2011/0228666 A1 | 9/2011 | Barbieri et al. |
| 2012/0057547 A1 | 3/2012 | Lohr et al. |
| 2012/0250631 A1 | 10/2012 | Hakola et al. |
| 2012/0269154 A1 | 10/2012 | Wang et al. |
| 2013/0039198 A1* | 2/2013 | Isojima ............... H04L 1/1861 370/252 |
| 2013/0148614 A1* | 6/2013 | Noh ................. H04L 5/006 370/329 |
| 2013/0201885 A1 | 8/2013 | Yang et al. |
| 2013/0242890 A1* | 9/2013 | He ................. H04L 12/189 370/329 |
| 2014/0003387 A1 | 1/2014 | Lee et al. |
| 2014/0079015 A1* | 3/2014 | Kim ................. H04L 27/0006 370/329 |
| 2014/0112261 A1 | 4/2014 | Chen et al. |
| 2014/0321377 A1* | 10/2014 | Ryu ................. H04W 72/566 370/329 |
| 2014/0334390 A1* | 11/2014 | Lindholm ............. H04L 5/0053 370/329 |
| 2015/0057011 A1 | 2/2015 | Di Girolamo et al. |
| 2015/0181589 A1 | 6/2015 | Luo et al. |
| 2016/0226637 A1* | 8/2016 | Nory ................. H04L 5/001 |
| 2016/0227417 A1 | 8/2016 | Yerramalli et al. |
| 2016/0302231 A1* | 10/2016 | Chien ................. H04W 72/23 |
| 2016/0338107 A1 | 11/2016 | Zeng et al. |
| 2017/0041805 A1* | 2/2017 | Chandrasekhar ..... H04L 1/1896 |
| 2017/0105124 A1 | 4/2017 | Tomeba et al. |
| 2017/0164384 A1* | 6/2017 | Wang ................. H04L 5/0092 |
| 2017/0251498 A1 | 8/2017 | Mukherjee et al. |
| 2017/0374679 A1* | 12/2017 | Park ................. H04W 74/0808 |
| 2018/0048412 A1 | 2/2018 | Zhang et al. |
| 2018/0092128 A1 | 3/2018 | Um et al. |
| 2018/0110057 A1 | 4/2018 | Park et al. |
| 2018/0124749 A1 | 5/2018 | Park et al. |
| 2018/0199351 A1* | 7/2018 | Ro ................. H04W 72/044 |
| 2018/0213563 A1* | 7/2018 | Yang ................. H04W 74/0808 |
| 2018/0249484 A1* | 8/2018 | Kim ................. H04W 74/0808 |
| 2018/0279347 A1* | 9/2018 | Wang ................. H04W 72/0446 |
| 2018/0288805 A1 | 10/2018 | Bhorkar et al. |

FOREIGN PATENT DOCUMENTS

| | | | |
|---|---|---|---|
| CN | 102812772 A | 12/2012 | |
| CN | 102958182 A | 3/2013 | |
| GB | 2494132 A | 3/2013 | |
| KR | 101531394 B1 | 6/2015 | |
| WO | 2015/113252 A1 | 8/2015 | |
| WO | WO-2016185275 A1 * | 11/2016 | ............ H04W 72/10 |

OTHER PUBLICATIONS

Supplemental Partial European Search Report issued Sep. 24, 2018 in European Application No. 16861446.9-1215.

Institute for Information Industry (III): "Discussion on Uplink Transmission in LAA", 3GPP Draft; R2-151383 Discussion on Uplink Transmission in LAA, 3rd Generation Partnership Project (3GPP), Mobile Competence Centre ; 650, Route Des Lucioles ; F-06921 Sophia-Antipolis Cedex ; France vol. RAN WG2, No. Bratislava, Slovakia; Apr. 20, 2015-Apr. 24, 2015 Apr. 19, 2015 (Apr. 19, 2015), http://www.3gpp.org/ftp/Meetings_3GPP SYNC/RAN2/Docs.

Intel Corporation _: "Further aspects of fast uplink access solutions", 3GPP Draft; R2-154386 Further Aspects of Fast Uplink Access Solutions, 3rd Generation Partnership Project (3GPP), Mobile Competence Centre ; 650, Route Des Lucioles ; F-06921 Sophia-Antipolis Cedex; vol. RAN WG2, No. Malmo, Sweden Oct. 5, 2015-Oct. 9, 2015, Oct. 4, 2015 (Oct. 4, 2015), www.3gpp.orgiftp/Meetings_3GPID_ SYNC/RAN2/Docs.

Extended Search Report issued in European Application 16861446.9-1215 dated Jan. 3, 2019.

Extended European search report issued on Sep. 14, 2020, in corresponding European patent Application No. 20172067.9, 10 pages.

Huawei et al., "Dynamic power sharing in multi-carrier operation", 3GPP TSG RAN WG1 82bis Meeting, R1-155656, Oct. 5-9, 2015, total 3 pages, Malmo, Sweden.

Ericsson, "On Framework and Parameters for Category-4 LBT for DL-only LAA", 3GPP TSG RAN WG1 #82bis, Malmo, Sweden, Oct. 5-9, 2015, R1-156035, pp. 1-4.

Samsung, "Discussion on UL transmission for LAA", 3GPP TSG RAN WG1 #80, Athens, Greece, Feb. 9-13, 2015, R1-150368, pp. 1-7.

LG Electronics; On the UE Behavior under Dynamic UL-DL Configuration Changes', May 20-24, 2013, 3GPP TSG RAN WG1 Meeting #73, R1-132230.

LG Electronics, "Details of UL-DL Reconfiguration Message", Aug. 19-23, 2013, 3GPP TSG RAN WG1 Meeting #74, R1-133366.

Institute for Information Industry (III), "Discussion on LAA Uplink Transmission", May 25-29, 2015, TSG RAN WGI meeting #81, 3GPP R1-153286.

Alcatel-Lucent Shanghai Bell, Alcatel-Lucent, "Remaining details of single-carrier LBT", Oct. 5-9, 2015, 3GPP TSG RAN WG1 Meeting #82bis, R1-155625.

Samsung, "Specifying dynamic TDD operation in 36.321" Mar. 31, 2014, 3GPP TSG-RAN WG2 Meeting #85bis, R2-141629.

* cited by examiner

| UE list | Priority level | Information bits representation of priority level |
|---|---|---|
| UE1 | 1 | 000 |
| UE2 | 2 | 001 |
| UE3 | 3 | 010 |
| UE4 | 4 | 011 |
| UE5 | 5 | 100 |

Figure 3

| | | | | | | | | | |
|---|---|---|---|---|---|---|---|---|---|
| D | D | D | D | D | D | D | D | D | D |
| D | S | U | U | U | U | U | U | U | U |
| D | D | S | U | U | U | U | U | U | U |
| D | D | D | S | U | U | U | U | U | U |
| D | D | D | D | S | U | U | U | U | U |
| D | D | D | D | D | S | U | U | U | U |
| D | D | D | D | D | D | S | U | U | U |
| D | D | D | D | D | D | D | S | U | U |
| D | D | D | D | D | D | D | D | S | U |
| U | U | U | U | U | U | U | U | U | U |

Figure 4

| | n | | | | | n+k | | | |
|---|---|---|---|---|---|---|---|---|---|
| D | D | D | D | D | S | U | U | U | U |
| | | Uplink grant | | | | PUSCH | | | |

BASE STATION-SIDE AND USER EQUIPMENT-SIDE APPARATUSES AND METHODS, AND WIRELESS COMMUNICATION SYSTEM

CROSS-REFERENCE TO RELATED APPLICATIONS

This application is a continuation of U.S. application Ser. No. 15/769,769, filed Apr. 20, 2018, which is based on PCT filing PCT/CN2016/103023, filed Oct. 24, 2016 and claims the priority to Chinese Patent Application No. 201510745617.0, titled "BASE STATION-SIDE AND USER EQUIPMENT-SIDE APPARATUSES AND METHODS, AND WIRELESS COMMUNICATION SYSTEM", filed with the Chinese State Intellectual Property Office on Nov. 5, 2015, the entire contents of each are incorporated herein by reference.

FIELD OF THE INVENTION

The present disclosure relates to the field of wireless communications, and particularly to the use of an unlicensed frequency band in the wireless communications, and more particularly to apparatus and methods on a base station side and on a user equipment side, and a wireless communication system.

BACKGROUND OF THE INVENTION

With the development and evolution of wireless networks, more and more services are carried by them, which requires additional spectrum resources to support a large amount of data transmission. The spectrum resources may be represented by parameters such as time, frequency, bandwidth, allowable maximum emitting power, or the like. Since most of the limited spectrum resources are already allocated to fixed operators and services, new available spectrum resources are rare or cost expensive.

On the basis of using the existing LTE network, cellular radio network operators make researches on how to use unlicensed spectrum resources, such as the frequency bands of 3.5 GHz and 5 GHz ISM. On the other hand, the wireless industry of WiFi deploys more and more WiFi systems on unlicensed frequency bands. Since the communication systems of different operators and the communication systems using different communication protocols have equal rights to use unlicensed frequency bands, it is desired in the industry to solve the problem of how to use the same unlicensed frequency band fairly and effectively. There are two existing manners of Licensed Assisted Access using the LTE (LAA-LTE) and Single Access using the LTE (SA-LTE), which however still have the problem of waste of uplink transmission resources.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present disclosure, an apparatus for a base station side of wireless communications is provided, which includes: a setting unit, configured to set, for a plurality of user equipment, different priority levels for the user equipment to use uplink transmission resources on an unlicensed frequency band; and a generating unit, configured to generate, for each of the user equipment, an uplink scheduling grant to use the same uplink transmission resources on the unlicensed frequency band, wherein, each uplink scheduling grant contains information of the priority level of the corresponding user equipment.

According to another aspect of the present disclosure, an apparatus for a user equipment side of wireless communications is provided, which provides: an energy detecting unit, configured to, in response to an uplink scheduling grant of uplink transmitting resources on an unlicensed frequency band and which is with respect to user equipment, perform energy detection on the unlicensed frequency band, wherein the uplink scheduling grant comprises information of priority level for the user equipment to use the uplink transmitting resources; and a determining unit, configured to determine, according to the information of the priority level and a result of the energy detection, whether the uplink scheduling grant is valid.

According to an aspect of the present disclosure, a method for a base station side of wireless communications is provided, which includes: setting, for a plurality of user equipment, different priority levels for using uplink transmission resources on an unlicensed frequency band; and generating, for each of the user equipment, an uplink scheduling grant to use the same uplink transmission resources on the unlicensed frequency band, wherein, each uplink scheduling grant contains information of the priority level of the corresponding user equipment.

According to another aspect of the present disclosure, a method for a user equipment side of wireless communications is provided, which includes: performing energy detection on an unlicensed frequency band, in response to an uplink scheduling grant of uplink transmitting resources on the unlicensed frequency band and which is with respect to user equipment, wherein, the uplink scheduling grant comprises information of priority level for the user equipment to use the uplink transmitting resources; and determining, according to the information of the priority level and a result of the energy detection, whether the uplink scheduling grant is valid.

According to another aspect of the present disclosure, a wireless communication method for a wireless communication system is provided, which includes: setting, for a plurality of user equipment, different priority levels for using uplink transmission resources on an unlicensed frequency band; generating, for each of the user equipment, an uplink scheduling grant to use the same uplink transmission resources on the unlicensed frequency band, wherein, each uplink scheduling grant contains information of the priority level of the corresponding user equipment; transmitting to each of the plurality of user equipment information of the uplink scheduling grant corresponding to the user equipment; receiving and responding to, by each of the user equipment, information of the uplink scheduling grant, and performing, by each of the user equipment, energy detection on the unlicensed frequency band; and determining, by each of the user equipment according to the information of the priority level and a result of the energy detection, whether the received uplink scheduling grant is valid.

According to another aspect of the present disclosure, a wireless communication system is provide, which includes a base station and at least one user equipment. The base station includes the above apparatus for a base station side of wireless communications, and the user equipment includes the above apparatus for a user equipment side of wireless communications.

According to other aspects of the present disclosure, there are also provided computer program codes and computer program products for implementing the methods for a base station side and a user equipment side of a wireless communication system, and a computer-readable storage medium recording the computer program codes for implementing the methods for a base station side and a user equipment side of a wireless communication system.

According to embodiments of the present disclosure, by transmitting the uplink scheduling grants for the same uplink transmission resources of the unlicensed frequency band to multiple user equipment with difference priority levels, the uplink transmission resources may be used by the multiple user equipment according to their priority levels. In other words, user equipment having a lower priority level may use the uplink transmission resources when user equipment having a high priority level cannot use the uplink transmission resources, thereby avoiding the waste of the uplink resources and thus improving the utilization ratio of the uplink resources on the unlicensed frequency band.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings:

FIG. 3 shows a diagram of an example of information bits for representing a priority level of a user equipment;

FIG. 4 shows a diagram of an example of a structure of a data burst frame;

DETAILED DESCRIPTION OF THE EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

Figure 1:
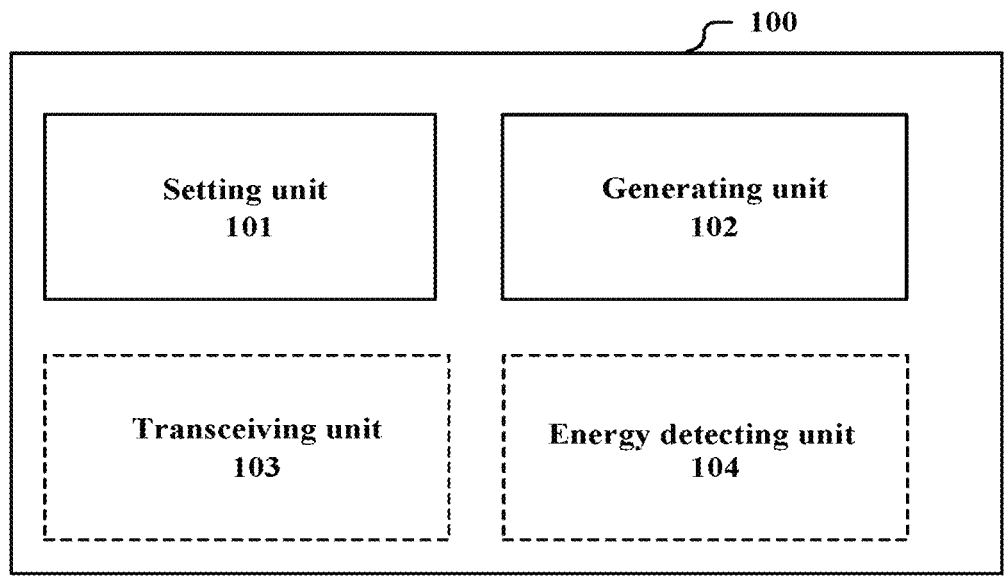
FIG. 1 is a schematic structural diagram of an apparatus for a base station side of wireless communications according to an embodiment of the present disclosure.

FIG. 1 is a structural diagram of an apparatus 100 for a base station side of wireless communications according to an embodiment of the present disclosure. As shown in FIG. 1, the apparatus 100 includes: a setting unit 101, configured to set, for a plurality of user equipment, different priority levels for the user equipment to use uplink transmission resources on an unlicensed frequency band; and a generating unit 102, configured to generate, for each of the user equipment, an uplink scheduling grant to use the same uplink transmission resources on the unlicensed frequency band, wherein, each uplink scheduling grant contains information of the priority level of the corresponding user equipment.

As mentioned above, the unlicensed frequency band may be commonly used by different wireless communication systems or different protocols. According to a rule of using an unlicensed frequency band, after receiving an uplink scheduling grant from a base station, user equipment needs to perform energy detection to determine whether the unlicensed frequency band is occupied at present so as to determine whether it can transmit data using the scheduled uplink transmission resources. The energy detection may be performed with respect to the uplink transmission resources corresponding to the uplink scheduling grant in the unlicensed frequency band, or with respect to a broader frequency range than the uplink transmission resources in the unlicensed frequency band, which depends on a specific system configuration. A detection threshold used in the energy detection may be determined by the base station. It can be understood that, the detection threshold determines the coverage size and the sensitivity of the energy detection. The lower the threshold is, the larger the coverage range is, and the higher the sensitivity is.

If a result of the energy detection indicates that the unlicensed frequency band is not available, which means that there is another wireless access point occupying the unlicensed frequency band in the coverage of the energy detection, the user equipment cannot use the uplink transmission resources on the unlicensed frequency band. In this case, the uplink scheduling grant is invalid, which causes a waste of the uplink transmission resources.

In the embodiment, for the same uplink transmission resources on the unlicensed frequency band, the generating unit 102 generates uplink scheduling grants for multiple user equipment. In other words, the multiple user equipment may each receive the uplink scheduling grant for the uplink transmission resources. However, only one of the user equipment can use the uplink transmission resources finally. To this point, the setting unit 101 sets different priority levels for the user equipment, so that a user equipment having a low priority level may user the uplink transmission resources in a case that a user equipment having a high priority level determines through the energy detection that the uplink transmission resources cannot be used, thereby improving the probability of being valid of the uplink scheduling grant and thus improving the utilization of the uplink transmission resources.

As shown in the dotted line block in FIG. 1, the apparatus 100 may further include a transceiving unit 103 configured to transmit to each of the multiple user equipment information of the uplink scheduling grant corresponding to the user equipment.

Figure 2:
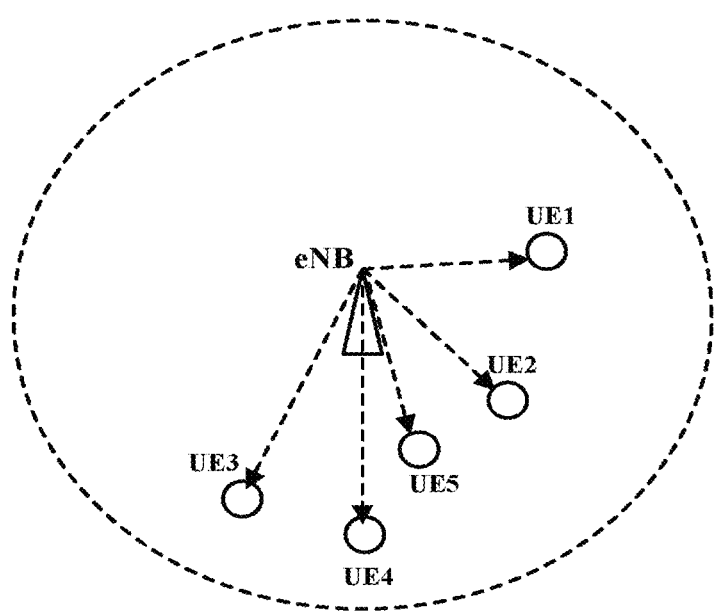
FIG. 2 is a schematic diagram of a wireless communication system according to an embodiment of the present disclosure.

FIG. 2 shows an example of a wireless communication system including a base station eNB and multiple user equipment (UE) UE1 to UE5. The eNB includes the apparatus 100 according to the embodiment. A dotted line arrow represents that the transceiving unit 103 sends to UE1 to UE5 uplink scheduling grants for the same uplink transmission resources. UE1 to UE5 have priority levels of 1 to 5 respectively, where 1 indicates the highest level and 5 indicates the lowest level. Only the uplink scheduling grant of one of the UEs can be valid finally. It is understood that, FIG. 2 only shows an example. The number of UEs receiving the uplink scheduling grants is not limited to 5, and correspondingly the number of priority levels is not limited to 5 either.

The uplink transmission resources may include at least one of: several resource blocks distributed continuously or comb-like, and an independent carrier (frequency band). For example, in the architecture of LAA-LTE, transmission resources may be allocated to the user equipment in resources blocks (RB), and transmission can be performed in a carrier aggregation manner. The resources blocks may be distributed continuously or comb-like in the frequency domain. For example, RB0, RB2, . . . , RB2n are allocated to a user equipment, and RB1, RB3, . . . , RB2n+1 are allocated to another user equipment. In the architecture of SA-LTE, the user equipment may be allocated with a broader bandwidth, such as an independent carrier or frequency band.

In an example, the setting unit 101 sets the priority level of a UE according to at least one of an uplink traffic amount of the user equipment and uplink QoS of the user equipment. For example, when the user equipment have a large uplink traffic amount and/or a high uplink QoS requirement, the priority level of the user equipment is set high. Apparently, the priority level may also be set for the user equipment according to other criterions. In an example, the setting unit 101 is configured to set, for multiple user equipment, different priority levels for using the same uplink transmission resources on an unlicensed frequency band.

As mentioned above, the information of the priority level of the user equipment may be notified to the user equipment by the base station, so that the user equipment may identify its own priority level. In an example, the uplink scheduling grant is transmitted by the transceiving unit 103 to the user equipment through a physical downlink control channel (PDCCH). The information of the priority level may be contained in the downlink control information (DCI) format 0/4, for example.

The information of the priority level may be represented by several information bits added to the DCI format 0/4. For example, in the scenario shown in FIG. 2, the total number of priority levels is 5 and thus 3 bits may be added to the DCI format 0/4 to represent the priority levels.

Alternatively, the information of the priority level may be represented by a carrier indicator in the DCI format 0/4. The carrier indicator occupies 3 bits, and thus may be used in a case where the number of the priority levels is no more than 8. For example, in the scenario of SA-LTE without using the carrier aggregation, the carrier indicator in the DCI format 0/4 is meaningless, and therefore can be reused to indicate the priority level. FIG. 3 shows a non-limiting example of correspondence between the information bits and the priority levels of user equipment.

It is understood that the information of the priority level may be represented by a method combining the above two methods, or by other appropriate signaling.

After receiving the uplink scheduling grant, the user equipment performs the energy detection, and obtains the information of its priority level from the uplink scheduling grant. Then the use equipment determines whether the uplink scheduling grant can be valid based on a result of the energy detection and the information of the priority level. The details of the detection and determination performed by the user equipment are provided in a second embodiment. At last, for example, the uplink scheduling grant for one user equipment, which has the highest priority among the user equipment which perform the energy detection indicating that the uplink transmission resources are available, is determined as valid.

The user equipment, which perform the energy detection indicating that the uplink transmission resources are available, may interchange their priority information with each other and determine that the uplink scheduling grant of the user equipment having the highest priority level is valid, and the uplink scheduling grants of the other user equipment having lower priority levels are invalid.

The transceiving unit 103 may further be configured to receive, from the user equipment for which the uplink scheduling grant is valid, the information of the priority level of the user equipment, so that the apparatus 100 identifies, from the information of the priority level, the user equipment for which the uplink scheduling grant is valid. Since the priority levels set by the setting unit for the multiple user equipment are different from each other, the apparatus can identify the user equipment based on the information of the priority level fed back from the user equipment. In this way, the apparatus 100 can determine that the received data is from which user equipment.

As an example, when the information of the priority level received by the transceiving unit 103 is null, the apparatus 100 identifies that the user equipment has the highest priority level. That is, when the uplink scheduling grant for the user equipment having the highest priority level is valid, the user equipment is not required to feedback its information of priority level to the base station.

The information of the priority level received by the transceiving unit 103 is carried in a physical uplink shared channel (PUSCH) transmitting block of the user equipment for which the uplink scheduling grant is valid.

A specific timing mapping relation may be defined between the uplink scheduling grant and a PUSCH sub-frame. That is, if the user equipment receive the uplink scheduling grant from a sub-frame n, only the sub-frame n+k can be used to transmit PUSCH data, where k>=4.

In an example, the base station may configure for user equipment, through high-level signaling or physical signaling, a particular data burst frame structure on an unlicensed frequency band. FIG. 4 shows an example of a data burst frame structure, in which each line represents a kind of data burst frame structure. In these examples, uplink sub-frames (U) are distributed continuously and downlink sub-frames (D) are distributed continuously, with special sub-frames (S) as a boundary.

Figures 5, 6:
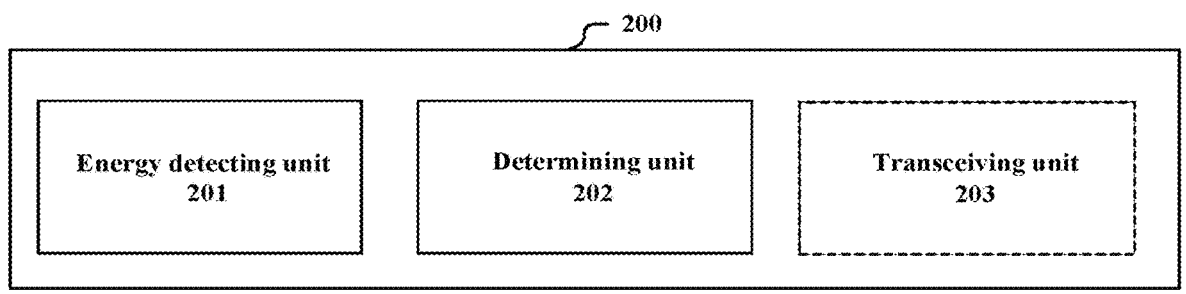
FIG. 5 is a schematic diagram of timing relationship between an uplink scheduling grant and a PUSCH subframe.
FIG. 6 is a schematic structural diagram of an apparatus for a user equipment side of wireless communications according to an embodiment of the present disclosure.

Taking the data burst frame structure in the sixth line as an example, FIG. 5 shows a timing relation between the uplink scheduling grant and the PUSCH sub-frame. In the example, a sub-frame previous to the PUSCH sub-frames is a special sub-frame. The special sub-frame may include a DwPTS, a guard period (GP) and an UpTPS. In this case, the user equipment may perform the energy detection in the GP and/or the UpTPS. The special sub-frame may include only a DwPTS and a GP. In this case, the user equipment may perform the energy detection in the GP.

In addition, as shown in another dotted line block in FIG. 1, the apparatus 100 may further include an energy detection unit 104 configured to perform energy detection on the unlicensed frequency band, and cause the setting unit 101 and the generating unit 102 to operate respectively in the case that the energy detection indicates that the unlicensed frequency band is idle. That is, before transmitting the uplink scheduling grant on the unlicensed frequency band to the user equipment, the apparatus 100 needs to perform the energy detection to determine that the unlicensed frequency band is available.

Generally, the apparatus 100 performs the energy detection in a range smaller than a coverage range of a cell. In an example, for selection of the multiple user equipment, for example, the setting unit 101 may set a highest priority level for user equipment which is the most expected to use the uplink transmission resources, and select user equipment in the energy detection range as the user equipment having lower priorities. This is because, to a certain degree, the base station knows situations of the user equipment in the energy detection range better than the situations of the user equipment in the coverage range of the cell but outside of the energy detection range.

In the embodiment, by scheduling by the apparatus 100 the same uplink transmission resources on an unlicensed frequency band for multiple user equipment based on priority levels, the probability of being valid of the uplink scheduling grant is improved and thus the utilization ratio of the uplink transmission resources is improved.

Second Embodiment

FIG. 6 is a schematic structural diagram of an apparatus for a user equipment side of wireless communications according to an embodiment of the present disclosure. As shown in FIG. 6, the apparatus 200 includes an energy detecting unit 201 and a determining unit 202. The energy detecting unit 201 is configured to, in response to an uplink scheduling grant of uplink transmitting resources on an unlicensed frequency band and which is with respect to user equipment, perform energy detection on the unlicensed frequency band, wherein the uplink scheduling grant includes information of priority level for the user equipment to use the uplink transmitting resources; the determining unit 202 is configured to determine, according to the information of the priority level and a result of the energy detection, whether the uplink scheduling grant is valid.

The energy detecting unit 201 is configured to detect whether there is another wireless access point in the energy detection range of the user equipment which is occupying the unlicensed frequency band for communication. If the result of the energy detection indicates that the unlicensed frequency band is being occupied at present, the present user equipment cannot user the scheduled uplink transmission resources to transmit data. On the contrary, if the result of the energy detection indicates that the unlicensed frequency band is idle currently, it is necessary to determine whether the uplink transmission resources can be used further in conjunction with the information of priority level contained in the uplink scheduling grant. This is because the same uplink transmission resources may be scheduled to multiple user equipment, and the present user equipment have the chance to use the uplink transmission resources only if all the other user equipment having higher priority levels than the present user equipment cannot use the uplink transmission resources. With this configuration, the probability of being valid of the uplink scheduling grant can be improved and further the utilization ratio of the uplink transmission resources is improved.

As shown in the dotted line block in FIG. 6, the apparatus 200 may further include a transceiving unit 203 configured to receive information of the uplink scheduling grant from a base station side. For example, the transceiving unit 203 may be implemented as a communication interface of the user equipment. It is noted that, the user equipment performs the energy detection upon receiving the information of the uplink scheduling grant, without considering its priority level. As mentioned above, the energy detection may be performed with respect to the uplink transmission resources corresponding to the uplink scheduling grant in the unlicensed frequency band, or with respect to a broader frequency range than the uplink transmission resources in the unlicensed frequency band, which depends on a specific system configuration.

Similar to the base station side, the energy detecting unit 201 needs to set an energy detecting threshold to perform the energy detection. The energy detecting threshold may be set by the base station side according to one of the following manners: the base station side sets according to a PUSCH transmitting power of the user equipment, the base station side sets according to a maximum transmitting power of the user equipment, the user equipment sets according to a PUSCH transmitting power, the user equipment sets according to an actual PUSCH transmitting power, and the user equipment sets according to a maximum transmitting power of the user equipment.

It is followed that, the energy detecting threshold may be set by the base station side or the user equipment itself. If the energy detecting threshold is set by the base station side, the base station side needs to first acquire the power conditions of the uplink transmission of the user equipment. After generating the uplink scheduling grant for the user equipment, the base station side further determines a power control parameter, an allocated resources block and the like for PUSCH transmission of the user equipment, and includes them into, for example, high-level signaling. Also, the base station side may estimate the PUSCH transmitting power of the user equipment based on the power control parameter, and set the energy detecting threshold based on the estimated PUSCH transmitting power. In addition, the base station side may perform the setting in a relatively fixed manner. For example, the base station side may set the energy detecting threshold according to the maximum transmitting power of the user equipment. It is understood that the base station side may notify the setting of the energy detecting threshold by using various existing signaling.

If the energy detecting threshold is set by the user equipment side, the user equipment side may estimate the PUSCH transmitting power based on a power control parameter or the like and set the energy detecting threshold based on the estimated PUSCH transmitting power, which is similar to the manner of the base station side. In addition, since the user equipment side can acquire a parameter of its power amplifier, the user equipment side can acquire an estimation of the actual PUSCH transmitting power, and thus set the energy detecting threshold more accurately based on the actual PUSCH transmitting power. For example, the user equipment may estimate an actual transmitting power of the first sub-frame in an uplink transmission burst and set the energy detecting threshold using the actual transmitting power. Alternatively, the user equipment side may directly set the energy detecting threshold using its maximum transmitting power, which is a relatively fixed manner. It is understood that, the above methods for setting the energy detecting threshold are only illustrative rather than limiting.

As mentioned above, the information of the priority level in the uplink scheduling grant may be contained in for example, downlink control information (DCI) format 0/4, and provided to the user equipment through PDCCH. For example, the information of the priority level may be denoted using multiple information bits added to the DCI format 0/4 and/or a carrier indicator in the DCI format 0/4.

Figure 7:
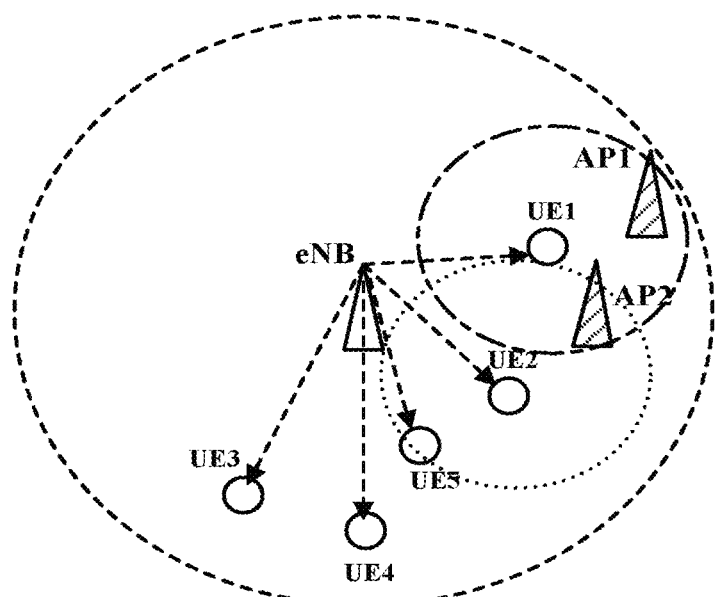
FIG. 7 is a schematic diagram of a wireless communication system according to an embodiment of the present disclosure.

The case of the user equipment having the highest priority level and the case of the user equipment having a non-highest priority level are described below with reference to the example of FIG. 7. FIG. 7 is similar to FIG. 2, only differing in that there further exist two nodes AP1 and AP2 which may use the unlicensed frequency band for communication and the dotted lines are used to show the energy detection ranges of UE1 and UE2, each being a circle centered at UE1 or UE2. It is understood that, the energy detection range is only an example, and the actual shape and size are not limited thereto. In addition, the energy detection ranges of UE3 to UE5 are not illustrated for clarity, but they are similarly as those of UE1 and UE2.

In an example, it is assumed the present user equipment have the highest priority level. The determining unit 202 is configured to determine the uplink scheduling grant is valid if the user equipment have the highest priority and the energy detection indicates the unlicensed frequency band is idle.

For example, referring to the example shown in FIG. 7, if the present user equipment is UE1 (also referred to as a primary user equipment) having the highest priority level, UE1 performs the energy detection after receiving the uplink scheduling grant (the energy detection range is shown as the dotted line block centered at UE1). If the result of the energy detection indicates that the unlicensed frequency band is idle at present, UE1 use the uplink transmission resources to transmit data to the base station, based on the information contained in the uplink scheduling grant.

In this case, the transceiving unit 203 is also configured to transmit a notification of the uplink scheduling grant being valid to other user equipment. Here, the other user equipment are user equipment which receive other uplink scheduling grants for the same uplink transmitting resources. Here, the other uplink scheduling grants are uplink scheduling grants for the other user equipment with respect to the same uplink transmission resources. In other words, the uplink transmission resources scheduled by the other uplink scheduling grants are the same as the uplink transmission resources scheduled by the uplink scheduling grant for the present user equipment, but user equipment to be granted are different. That is, the base station schedules the same uplink transmission resources for the present user equipment and the other user equipment. Still referring to the example of FIG. 7, the other user equipment are UE2 to UE5, for example.

When the uplink scheduling grant of UE1 is valid, in order to avoid conflict, this fact should be notified to the other scheduled user equipment UE2 to UE5, so that they give up using the uplink transmission resources. The notification may be transmitted via device to device (D2D) communication or in a way of broadcast. For example, the transceiving unit 203 may transmit the notification on D2D resources, or transmit the notification on resources on an unlicensed frequency band which are reserved for the D2D communication. Alternatively, the transceiving unit 203 may transmit the notification via broadcast on an unlicensed frequency band.

For example, the transceiving unit 203 may transmit the notification at predetermined time-frequency resources, such that when not receiving the notification at the predetermined time-frequency resources, the other user equipment determine that the present user equipment, i.e., the user equipment (such as UE1) having the highest priority, cannot use the uplink transmission resources.

Figure 8:
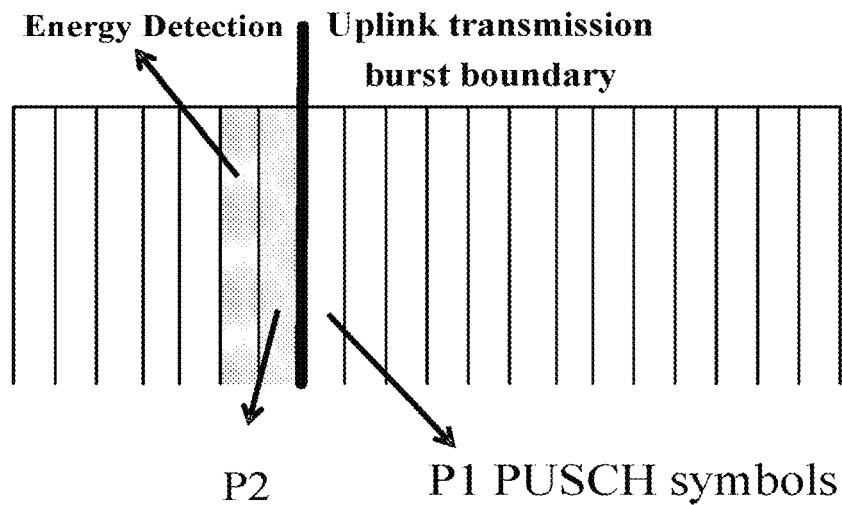
FIG. 8 is a schematic diagram showing possible positions of predetermined time-frequency resources.

The predetermined time-frequency resources may be located at the first symbol of a PUSCH sub-frame corresponding to the uplink scheduling grant, or the last symbol of a sub-frame previous to a PUSCH sub-frame corresponding to the uplink scheduling grant. FIG. 8 is a schematic diagram showing possible positions of the predetermined time-frequency resources. The thick solid line in FIG. 8 represents an uplink transmission burst boundary. The right side of the thick solid line represents a PUSCH sub-frame corresponding to the uplink scheduling grant, each column representing a PUSCH symbol. In this example, the predetermined time-frequency resources may be located at the symbol P1.

In addition, the predetermined time-frequency resources may also be located at the symbol P2, i.e., the last symbol of a sub-frame previous to the PUSCH sub-frame. In a case that the notification is transmitted on the unlicensed frequency band and the sub-frame previous to the PUSCH sub-frame is a downlink sub-frame, the downlink sub-frame may be configured to one of the following: a truncated physical downlink shared channel (PDSCH) sub-frame, a special sub-frame, and a special sub-frame keeping only DwPTS. A normal PDSCH sub-frame includes 14 OFDM symbols, while a truncated PDSCH sub-frame includes less than 14 OFDM symbols, such as 11, 12, 8, or 9 OFDM symbols. For example, FIG. 5 shows an example of a case where the sub-frame previous to the PUSCH sub-frame is a special sub-frame.

FIG. 8 further shows an example of timing of performing the energy detection by the user equipment. In principle, the user equipment may perform the energy detection at any position between receiving the uplink scheduling grant and the PUSCH sub-frame. In the example shown in FIG. 8, the energy detection is performed at the penultimate symbol of the special sub-frame.

Accordingly, if the other user equipment receive the notification at the predetermined time-frequency resources, the other user equipment can determine that the uplink scheduling grant of the primary user equipment becomes valid, and thus give up using the same uplink transmission resources. Otherwise, if the other user equipment do not receive the notification at the predetermined time-frequency resources, the other user equipment may determine that the uplink scheduling grant of the primary user equipment is invalid. In this case, the user equipment, whose energy detections indicate the unlicensed frequency band is idle, can exchange information of priority level between them to determine which user equipment can use the uplink transmission resources.

In another example, it is assumed that the present user equipment do not have the highest priority, such as any one of UE2 to UE5 in FIG. 7. In this case, the determining unit 202 may be configured to determine whether the uplink scheduling grant becomes valid according to information of priority level of at least one second user equipment, in a case that the energy detection performed by the user equipment indicates that the unlicensed frequency band is idle. The at least one second user equipment are user equipment that performs energy detection in response to other uplink scheduling grant for the same uplink transmitting resources and detects that the unlicensed frequency band is idle.

Assuming that the user equipment is UE3 in FIG. 7, UE3 performs the energy detection after receiving the uplink scheduling grant. If a result of the energy detection indicates that the unlicensed frequency band is idle, the determining unit 202 determines whether its uplink scheduling grant can become valid according to results of energy detection of other user equipment (i.e., UE1, and UE3 to UE5).

In the example of FIG. 7, if there are other access points (AP1 and AP2) using the unlicensed frequency band in the energy detection range of UE1 and UE2, which means that the detection results of UE1 and UE2 each indicates that the unlicensed frequency band is being occupied, while detection results of UE3 to UE5 each indicates that the unlicensed frequency band is idle, UE4 and UE5 are second user equipment in this case. Since each of the second user equipment has a priority level lower than the present user equipment, the determining unit 202 can determine that the uplink scheduling grant for present host user equipment is valid. In addition, if detection results of UE1 and UE2 also indicate that the unlicensed frequency band is idle, UE3 cannot use the uplink transmission resources.

For example, if the detection result of UE1 (primary user equipment) indicates that the unlicensed frequency band is idle, the other UEs including UE3 may receive the notification that the uplink scheduling grant of UE1 is valid.

Therefore, the transceiving unit 203 may be further configured to receive from a primary user equipment (the user equipment that receives the uplink scheduling grant for the same uplink transmitting resources and has the highest priority level) at predetermined time-frequency resources a notification of the uplink scheduling grant being valid. The transceiving unit 203 is configured to interchange with the second user equipment the information of the priority level when the transceiving unit 203 fails to receive the notification at the predetermined time-frequency resources. In this way, the user equipment may know whether there is another user equipment that has a higher priority level and whose energy detection indicates that the unlicensed frequency band is available, and thus determine whether it can use the uplink transmission resources. Similarly, as mentioned above, the transceiving unit 203 may receive the notification through D2D communication or via broadcast.

Also, the interchange of the information of the priority level between the user equipment may be performed through device to device communication or broadcast, and may be performed by using resources on the unlicensed frequency band. For example, such an interchange may be performed at the position of P2 shown in FIG. 8.

In this example, if the user equipment only have two priority levels, in a case of a user equipment having the highest priority level and the present user equipment having the second highest priority level, the uplink scheduling grant of the present user equipment is valid if the energy detection performed by the present user equipment indicates that the unlicensed frequency band is idle and the energy detection performed by the user equipment having the highest priority level indicates that the unlicensed frequency band is being occupied. In this case, there is no second user equipment. Alternatively, the user equipment have more priority levels, but the energy detection performed by the user equipment other than the present user equipment all indicates that the unlicensed frequency band is occupied. In this case, the uplink scheduling grant of the present user equipment is valid, and there is no second user equipment either.

In addition, the transceiving unit 203 is further configured to transmit the information of the priority level of the user equipment to the base station, so that the base station can identify the successfully scheduled user equipment at last. For example, this information may be carried in a PUSCH transmission block. In the example of FIG. 7, when the uplink scheduling grant of UE3 is valid, UE3 multiplexes the information of priority level "3" in the PUSCH transmission block, and transmit it to the base station. Since the priority levels and the user equipment are in one-to-one correspondence, the base station can identify UE3 based on the information. Particularly, when the user equipment having the highest priority is successfully scheduled, it may not feedback the information of the priority level to the base station.

Third Embodiment

Figure 9:
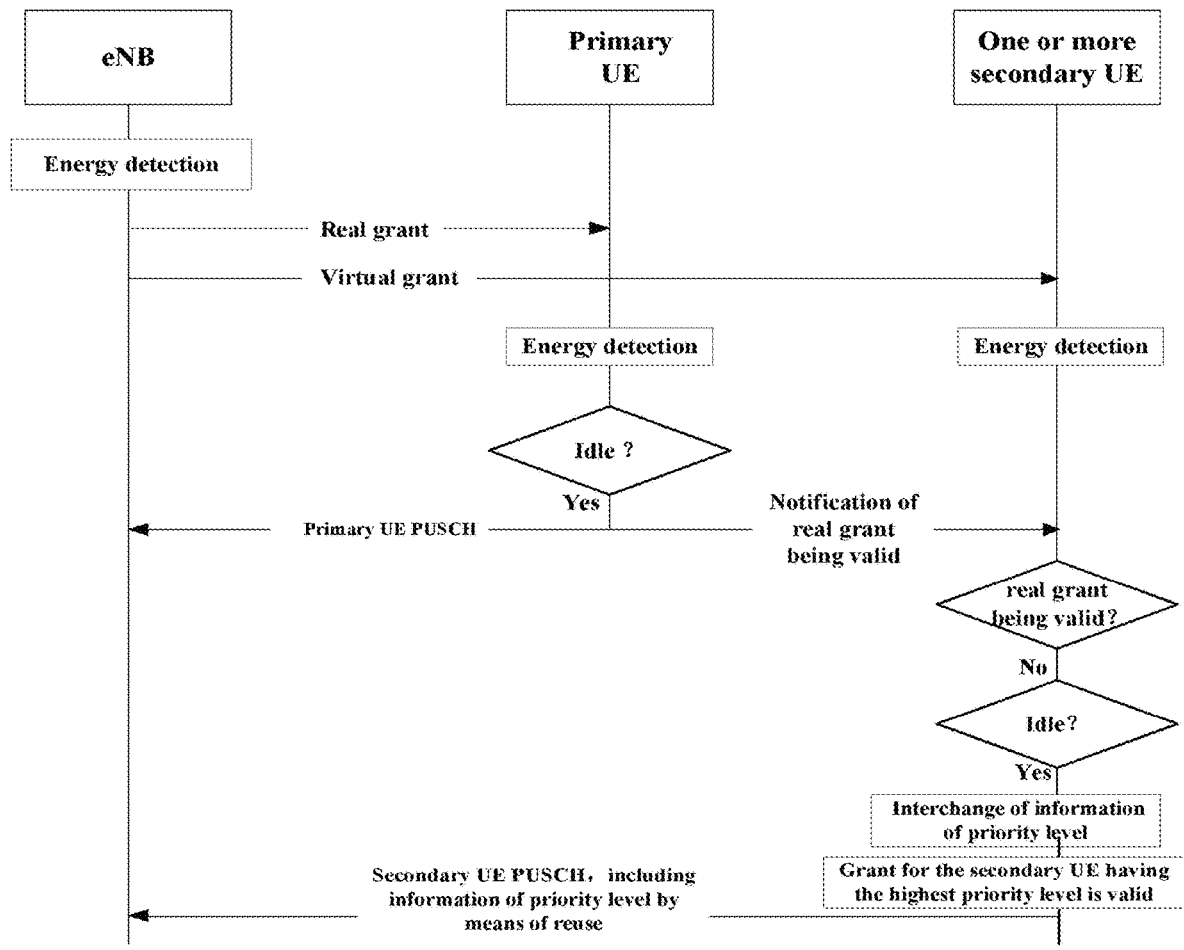
FIG. 9 is a schematic diagram showing information procedure between a base station and a user equipment.

For ease of understanding, a system embodiment is provided with reference to the wireless communication system in FIG. 7. The base station eNB includes the apparatus described with reference to FIG. 1, and the user equipment UE1 to UE5 each include the apparatus 200 described with reference to FIG. 6. After the eNB detects that an unlicensed frequency band is available through the energy detection, the eNB sends the uplink scheduling grant for the same uplink transmission resources on the unlicensed frequency band to each of UE1 to UE5 having the priority levels from the highest to the lowest. In this embodiment, UE1 is taken as a primary user equipment, and UE2 to UE5 are taken as secondary user equipment having different priority levels from each other. FIG. 9 shows an example of information procedure between the base station and the user equipment. The wireless communication system shown in FIG. 7 is described below with reference to FIG. 9.

UE1 to UE5 each receives from the eNB the uplink scheduling grant for the same uplink transmission resources. The uplink scheduling grants respectively include the information of priority level of UE1 to UE5, i.e., 1 to 5. The uplink scheduling grant received by UE1 is referred to as "real grant", and the uplink scheduling grants received by the other UEs are referred to as "virtual grant". The uplink scheduling grant is sent to the user equipment through PDCCH. The information of the priority level may be contained in DCI format 0/4, for example. In this example, the information of the priority level may be denoted using a carrier indicator (3 bits) in the DCI format 0/4. In addition, the information of the priority level may be denoted using multiple information bits added to the DCI format 0/4, or using a combination of the two methods.

Upon receiving the uplink scheduling grant, UE1 to UE5 perform the energy detection. A threshold used in the energy detection is set by the base station and notified to the UEs. If the energy detection indicates that no other equipment in the energy detection range is using the unlicensed frequency band for communication, it is determined that the unlicensed frequency band is idle (or available), otherwise it is determined that the unlicensed frequency band is being occupied and the uplink scheduling grant is invalid. If the energy detection performed by UE1 indicates that the unlicensed frequency band is idle, for example, if AP1 and AP2 in the vicinity of UE1 do not operate on the unlicensed frequency band in the scenario shown in FIG. 7, the real grant for UE1 is valid and then UE1 transmits data to the eNB in the PUSCH transmission block.

In addition, UE1 send the notification of the real grant being valid to the other UEs, so that the virtual grants are invalid. As mentioned above, UE1 may send the notification through D2D communication or broadcast. The D2D communication and broadcast may be performed on the unlicensed frequency band. UE1 may send the notification at predetermined time-frequency resources. The predetermined time-frequency resources may be located at the first symbol of a PUSCH sub-frame corresponding to the uplink scheduling grant or the last symbol of a sub-frame previous to a PUSCH sub-frame corresponding to the uplink scheduling grant. Accordingly, the energy detection may be performed at the penultimate symbol of a sub-frame previous to the PUSCH sub-frame, such that the timing of energy detection is closer to the timing of transmitting data, thereby creating a more accurate result.

When receiving the notification at the predetermined time-frequency resources, UE2 to UE5 know that the real grant is already valid and the received virtual grants received by them are invalid, and thus give up using the corresponding uplink transmission resources. On the other hand, if UE2 to UE5 fail to receive the notification at the predetermined time-frequency resources, the secondary UE(s) among UE2 to UE5 whose energy detection indicates that the unlicensed frequency band is idle may have the chance to use the corresponding uplink transmission resources. For example, the secondary UEs whose energy detection indicates that the unlicensed frequency band is idle interchange their respective priority level information, and the virtual grant of the secondary UE having the highest priority level is valid.

For example, in the scenario shown in FIG. 7, if the AP in the vicinity of UE1 operates on the unlicensed frequency band, the energy detection performed by UE1 indicates that the unlicensed frequency band is occupied, and thus the real grant is invalid. At this point, UE1 sends no information, and UE2 to UE5 do not receive the notification at the predetermined time-frequency resources. If the energy detection performed by UE2 indicates that the unlicensed frequency band is being occupied while the energy detection performed by UE3 to UE5 each indicate that the unlicensed frequency band is idle, UE3 to UE5 interchange their information of the priority level between them. UE3 finds out that it has the highest priority level, and thus determines that the virtual uplink scheduling grant sent from the eNB to UE3 is valid. Therefore, UE3 can transmit uplink data. Accordingly, UE4 and UE5 find that there is another secondary UE whose energy detection indicates the unlicensed frequency band is idle has higher priority level than their priority levels, and thus determine that their virtual uplink schedule grants sent from the eNB are invalid, which means that they still cannot transmit uplink data.

When the real grant of the primary UE is valid, the primary UE needs not to feedback any information to the eNB. When the virtual grant of a secondary UE is valid, the secondary UE should feedback its information of priority level to the eNB by, for example, multiplexing the information of the priority level in the PUSCH transmission block to send to the eNB. In this way, the eNB can identify the PUSCH transmission block comes from which UE, according to the information of the priority level.

It is noted that, UE may perform data packaging while performing the energy detection, so as to immediately transmit data once the uplink scheduling grant is valid. It is understood that, the above system embodiment is only illustrative rather than limiting. Reference may be made to the first and second embodiments for details, and some adaptions may also be made.

According to the above embodiments, by providing the uplink scheduling grants for the same uplink transmission resources to multiple user equipment, the uplink transmission resources may be used by a secondary user equipment in a case that the primary user equipment cannot use the uplink transmission resources, thereby improving the probability of being valid of the uplink scheduling grant and thus improving the utilization ratio of the uplink transmission resources.

Fourth Embodiment

In the process of describing the apparatuses for base station side and user equipment side of a wireless communication system in the embodiments described above, obviously, some processing and methods are also disclosed. Hereinafter, an overview of the methods is given without repeating some details disclosed above. However, it should be noted that, although the methods are disclosed in a process of describing the apparatuses for the base station side and user equipment side of the wireless communication system, the methods do not certainly employ or are not certainly executed by the aforementioned components. For example, the embodiments of the apparatuses for the base station side and user equipment side of the wireless communication system may be partially or completely implemented with hardware and/or firmware, and the methods described below may be executed by a computer-executable program completely, although the hardware and/or firmware of the apparatuses for the base station side and user equipment side of the wireless communication system can also be used in the methods.

Figure 10:
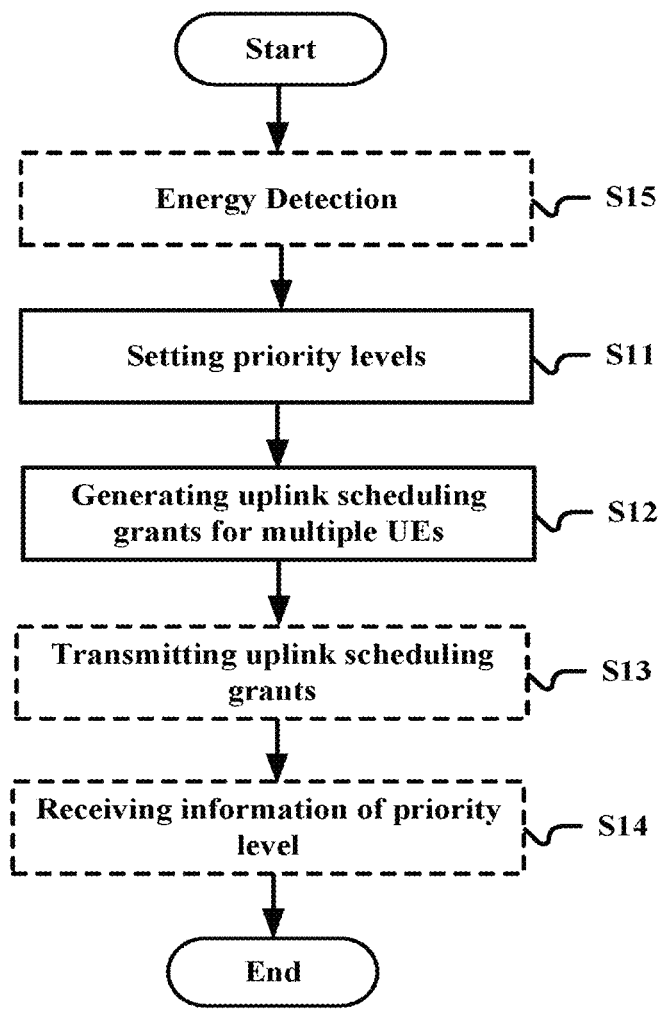
FIG. 10 is a flowchart of a method for a base station side of wireless communications according to an embodiment of the present disclosure.

FIG. 10 shows a flowchart of a method for a base station side of wireless communications according to an embodiment of the present disclosure. The method includes: setting, for a plurality of user equipment, different priority levels for the user equipment to use uplink transmission resources on an unlicensed frequency band (S11), and generating, for each of the user equipment, an uplink scheduling grant to use the same uplink transmission resources on the unlicensed frequency band, wherein, each uplink scheduling grant contains information of the priority level of the corresponding user equipment (S12).

The uplink transmitting resources includes at least one of: several resource blocks distributed continuously or comb-like, and an independent carrier.

In Step S11, the priority level may be set according to at least one of an uplink traffic amount of the user equipment and uplink QoS of the user equipment. For example, the information of the priority level may be contained in downlink control information (DCI) format 0/4. The information of the priority level may be denoted using at least one of a carrier indicator in the DCI format 0/4, and several information bits added to the DCI format 0/4.

As shown in a dotted line block in FIG. 10, the method may further include a step S13 of transmitting to each of the plurality of user equipment information of the uplink scheduling grant corresponding to the user equipment. The information may be transmitted through a PDCCH, for example.

In addition, the method may further include a step S14 of receiving, from the user equipment for which the uplink scheduling grant is valid, the information of the priority level of the user equipment, so that it is identified, from the information of the priority level, the user equipment for which the uplink scheduling grant is valid. In an example, when the information of the priority level received in step S14 is null, it is identified that the user equipment has the highest priority level.

The received information of the priority level may be carried in a physical uplink shared channel (PUSCH) transmitting block of the user equipment for which the uplink scheduling grant is valid.

In addition, the method may further include a step S15 of performing energy detection on the unlicensed frequency band, and performing the other steps in the case that the energy detection indicates that the unlicensed frequency band is idle.

Figure 11:
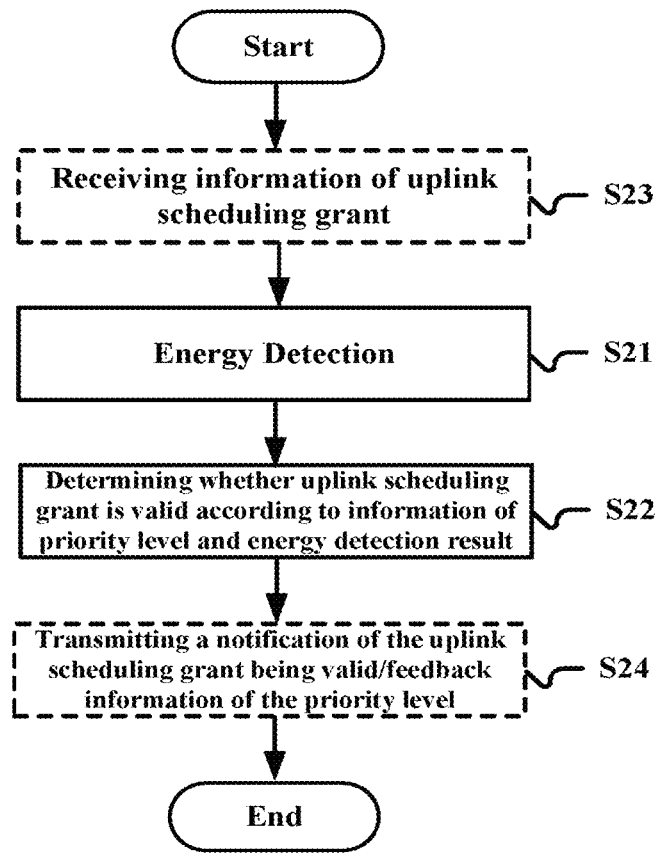
FIG. 11 is a flowchart of a method for a user equipment side of wireless communications according to an embodiment of the present disclosure.

FIG. 11 is a flowchart of a method for a user equipment side of wireless communications according to an embodiment of the present disclosure. The method includes: performing energy detection on an unlicensed frequency band in response to an uplink scheduling grant of uplink transmitting resources on the unlicensed frequency band with respect to a user equipment, where the uplink scheduling grant includes information of priority level for the user equipment to use the uplink transmitting resources (S21); and determining, according to the information of the priority level and a result of the energy detection, whether the uplink scheduling grant is valid (S22).

As shown in the dotted line block in FIG. 11, the above method may further include a step S23 of receiving information of the uplink scheduling grant from a base station side.

The information of the uplink scheduling grant may be received through a PDCCH, and the information of the priority level may be contained in the downlink control information (DCI) format 0/4. The information of the priority level may be denoted using at least one of a carrier indicator in the DCI format 0/4, and several information bits added to the DCI format 0/4.

In an example, in step S22, the uplink scheduling grant is determined as valid in a case that the user equipment has the highest priority level and the energy detection indicates that the unlicensed frequency band is idle. The method further include a step S24 of transmitting a notification of the uplink scheduling grant being valid to other user equipment, where the other user equipment are the user equipment that receive other uplink scheduling grants for the same uplink transmitting resources. In an example, in step S24, the notification is transmitted at predetermined time-frequency resources, so that the other user equipment determine, when not receiving the notification at the predetermined time-frequency resources, that the user equipment cannot use the uplink transmitting resources. For example, the notification may be transmitted via D2D communication or via broadcast. For example, the predetermined time-frequency resources can be located at the first symbol of a PUSCH sub-frame corresponding to the uplink scheduling grant or the last symbol of a sub-frame previous to a PUSCH sub-frame corresponding to the uplink scheduling grant. In a case that the notification is transmitted on the unlicensed frequency band and the sub-frame previous to the PUSCH sub-frame is a downlink sub-frame, the downlink sub-frame can be configured to be one of a truncated physical downlink shared channel sub-frame, a special sub-frame, and a special sub-frame keeping only DwPTS.

In another example, in step S22, the determination is performed according to information of priority level of a second user equipment, in a case that the user equipment does not have the highest priority level and the energy detection indicates that the unlicensed frequency band is idle. The second user equipment are the user equipment that perform energy detection in response to other uplink scheduling grants for the same uplink transmitting resources and detect that the unlicensed frequency band is idle. If each of the second user equipment has a priority level lower than the priority level of the user equipment, it is determined in step S22 that the uplink scheduling grant for the user equipment is valid.

For example, the notification of the uplink scheduling grant being valid from a primary user equipment may be received at predetermined time-frequency resources. The primary user equipment is the user equipment that receives the uplink scheduling grant for the same uplink transmitting resources and has the highest priority level. If the user equipment fails to receive the notification at the predetermined time-frequency resources, the user equipment interchanges with the second user equipment the information of their respective priority level, so as to perform the above determination based on the information of the priority level obtained by the interchange.

In this case, the information of the priority level of the user equipment is fed back to the base station in step S24. For example, the information of the priority level may be transmitted through a PUSCH transmission block.

It is noted that the above methods may be applied alone or in a combined manner.

When combining the above methods, a wireless communication method for a wireless communication system is provided. The wireless communication method for the wireless communication system includes the following steps of setting, for multiple user equipment, different priority levels for using uplink transmission resources on an unlicensed frequency band; generating, for each of the user equipment, an uplink scheduling grant to use the same uplink transmission resources on the unlicensed frequency band, where the uplink scheduling grant contains information of the priority level of the user equipment; transmitting to each of the multiple user equipment information of the uplink scheduling grant corresponding to the user equipment; receiving, by each of the user equipment, the uplink scheduling grant, and performing, by each of the user equipment, energy detection on the unlicensed frequency band in responses to the information of the uplink scheduling grant; and determining, by each of the user equipment according to the information of the priority level and a result of the energy detection, whether the received uplink scheduling grant is valid. In the step of determining whether the received uplink scheduling grant is valid, it is ensured that at most one uplink scheduling grant for the user equipment is valid. For example, it may be designed that the uplink scheduling grant received by the user equipment with the highest priority level among the user equipment for which the energy detection indicates that the unlicensed frequency band is idle is valid and the uplink scheduling grants for other user equipment are invalid.

The details of the above methods are described in the first to third embodiments, which are not repeated herein.

APPLICATION EXAMPLES

The technology in the present disclosure may be applied to various products. For example, the frequency spectrum management apparatuses 100 and 200 may be implemented as any type of server, such as a tower server, a rack server or a blade server. The frequency spectrum management apparatuses 100 and 200 may be control modules installed on the server (such as an integrated circuit module including a single wafer, and a card or a blade inserted into a slot of the blade server).

In addition, the above mentioned base station 300 may be implemented as any type of evolved node B (eNB), such as a macro eNB and a small eNB. The small eNB may be an eNB such as a pico eNB, a micro eNB, and a home (femto) eNB that covers a cell smaller than a macro cell. Alternatively, the base station may be implemented as any other types of base stations such as a NodeB and a base transceiver station (BTS). The base station may include: a main body (that is also referred to as a base station apparatus) configured to control radio communication, and one or more remote radio heads (RRH) disposed in a different place from the main body. Further, the various types of user equipment to be described later may operate as the base station by performing the base station function temporarily or semi-permanently.

For example, the user equipment 400 may be implemented as a mobile terminal (such as a smart phone, a panel personal computer (PC), a notebook PC, a portable game terminal, a portable/dongle mobile router and a digital camera) or an on-board terminal device (such as a car navigation device). The user equipment 400 may also be implemented as a terminal device for performing machine to machine (M2M) communication (which is also referred to as a machine-type communication (MTC) terminal device). Further, the user equipment 400 may be a wireless communication module mounted on each of the above terminals (such as integrated circuit module including a single chip).

Application Examples of the Base Station

First Application Example

Figure 12:
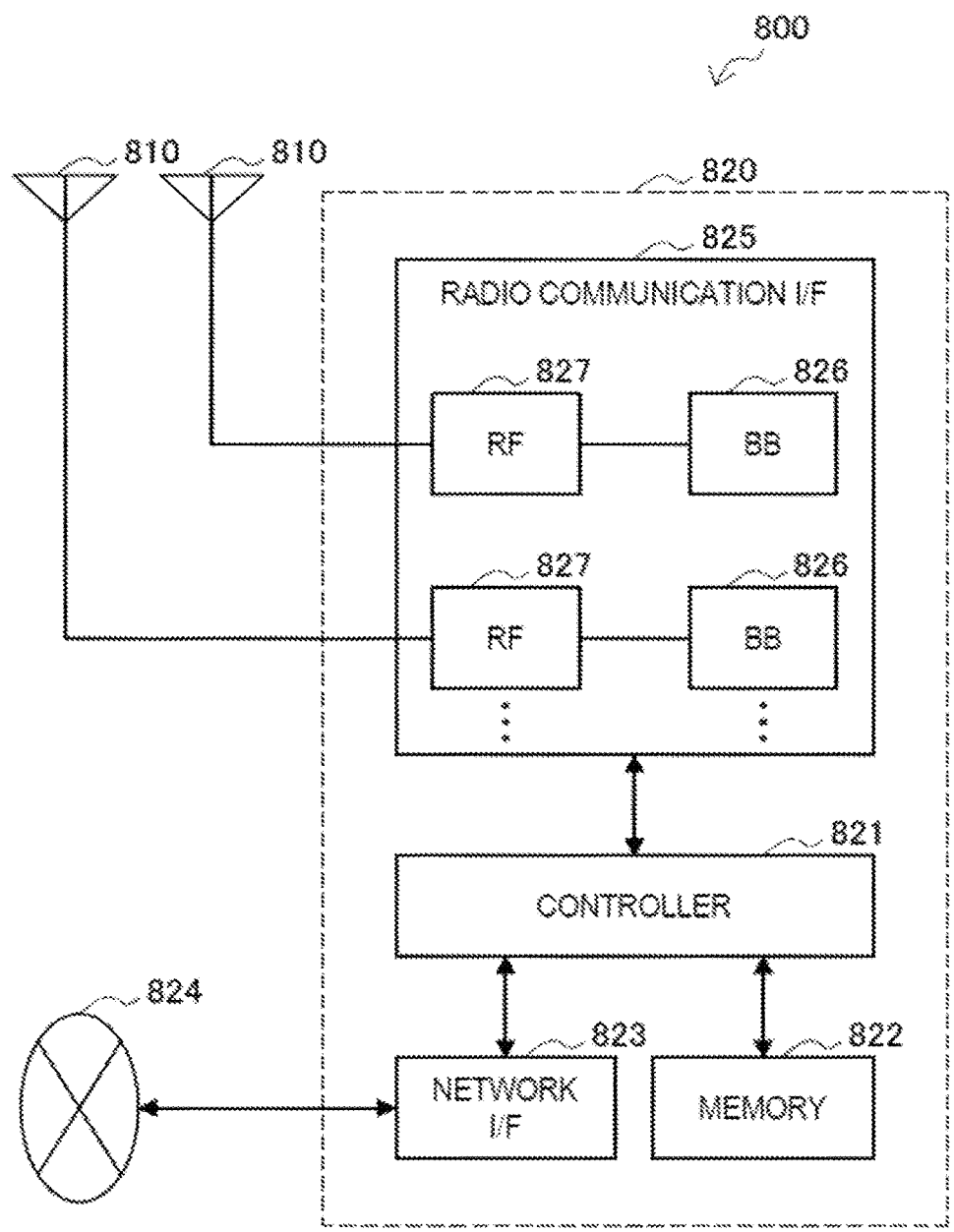
FIG. 12 is a block diagram of a first example of a schematic configuration of an evolved Node B (eNB) to which the technology of the present disclosure may be applied.

FIG. 12 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in a Multiple Input Multiple Output (MIMO) antenna), and is used for the base station apparatus 820 to transmit and receive radio signals. The eNB 800 may include the multiple antennas 810, as illustrated in FIG. 12. For example, the multiple antennas 810 may be compatible with multiple frequency bands used by the eNB 800. Although FIG. 12 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an Si interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 12. For example, the multiple BB processors 826 may be compatible with multiple frequency bands used by the eNB 800. The radio communication interface 825 may include the multiple RF circuits 827, as illustrated in FIG. 12. For example, the multiple RF circuits 827 may be compatible with multiple antenna elements. Although FIG. 12 illustrates the example in which the radio communication interface 825 includes the multiple BB processors 826 and the multiple RF circuits 827, the radio communication interface 825 may also include a single BB processor 826 or a single RF circuit 827.

In the eNB 800 as shown in FIG. 12, the transceiving unit 103 described with reference to FIG. 1 may be implemented by the radio communication interface 825. At least a part of the functions may be performed by the controller 821. For example, the controller 821 may generate, for multiple user equipment, an uplink scheduling grant to use the same uplink transmission resources on the unlicensed frequency band by performing the functions of the setting unit 101, the generating unit 102 and the energy detecting unit 104.

Second Application Example

Figure 13:
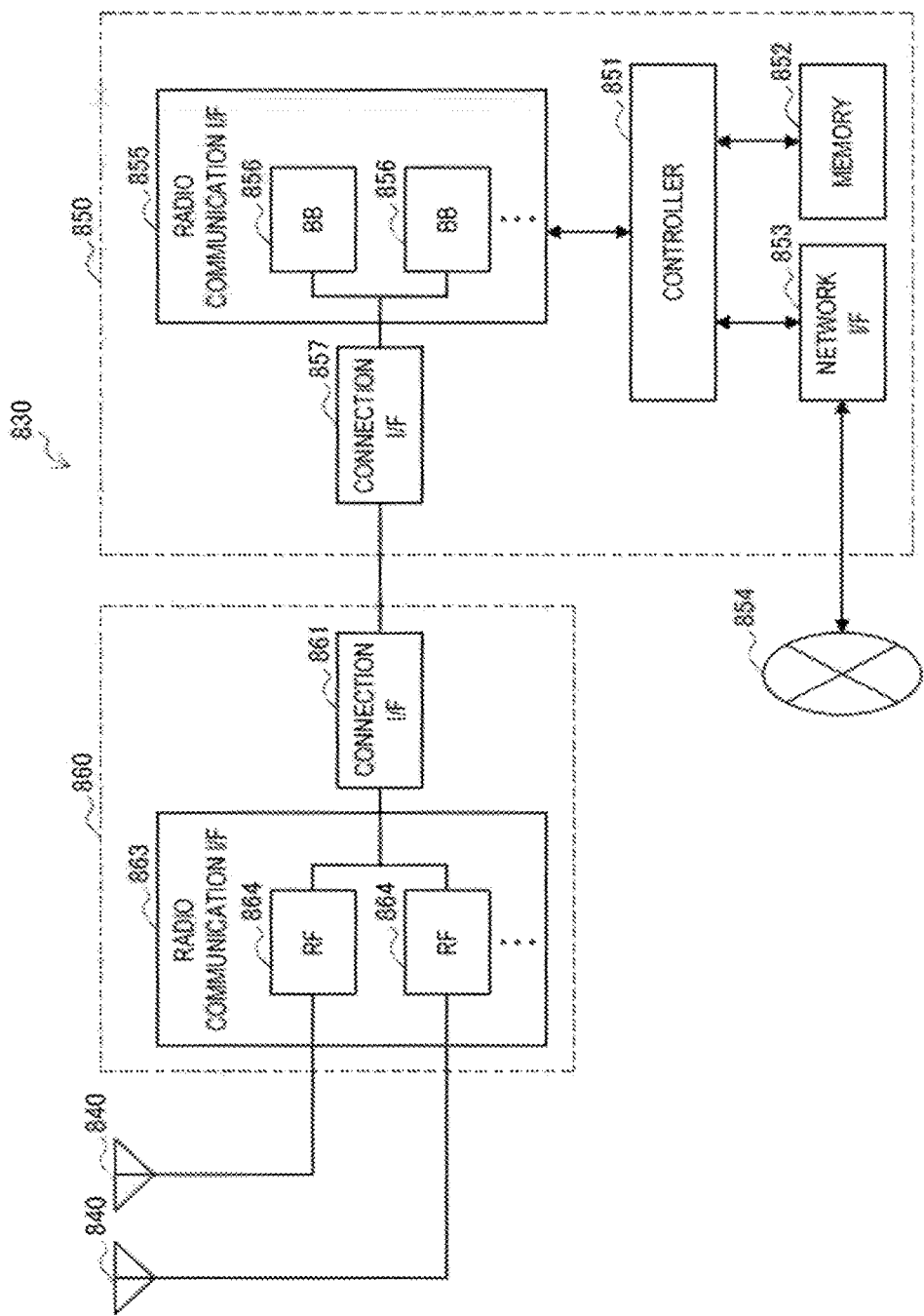
FIG. 13 is a block diagram of a second example of a schematic configuration of an eNB to which the technology of the present disclosure may be applied.

FIG. 13 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 13. For example, the multiple antennas 840 may be compatible with multiple frequency bands used by the eNB 830. Although FIG. 13 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 12.

The radio communication interface 855 supports any cellular communication scheme (such as LTE and LTE-Advanced), and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 12, except the BB processor 856 is connected to the RF circuit 864 of the RRH 860 via the connection interface 857. The radio communication interface 855 may include the multiple BB processors 856, as illustrated in FIG. 13. For example, the multiple BB processors 856 may be compatible with multiple frequency bands used by the eNB 830. Although FIG. 13 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 13. For example, the multiple RF circuits 864 may support multiple antenna elements. Although FIG. 13 illustrates the example in which the radio communication interface 863 includes the multiple RF circuits 864, the radio communication interface 863 may also include a single RF circuit 864.

In the eNB 830 as shown in FIG. 13, the transceiving unit 103 described with reference to FIG. 1 may be implemented as the radio communication interface 855 and/or the radio communication interface 863. At least a part of the functions may be performed by the controller 851. For example, the controller 851 may generate, for multiple user equipment, an uplink scheduling grant to use the same uplink transmission resources on the unlicensed frequency band by performing the functions of the setting unit 101, the generating unit 102 and the energy detecting unit 104.

Application Example of the User Equipment

First Application Example

Figure 14:
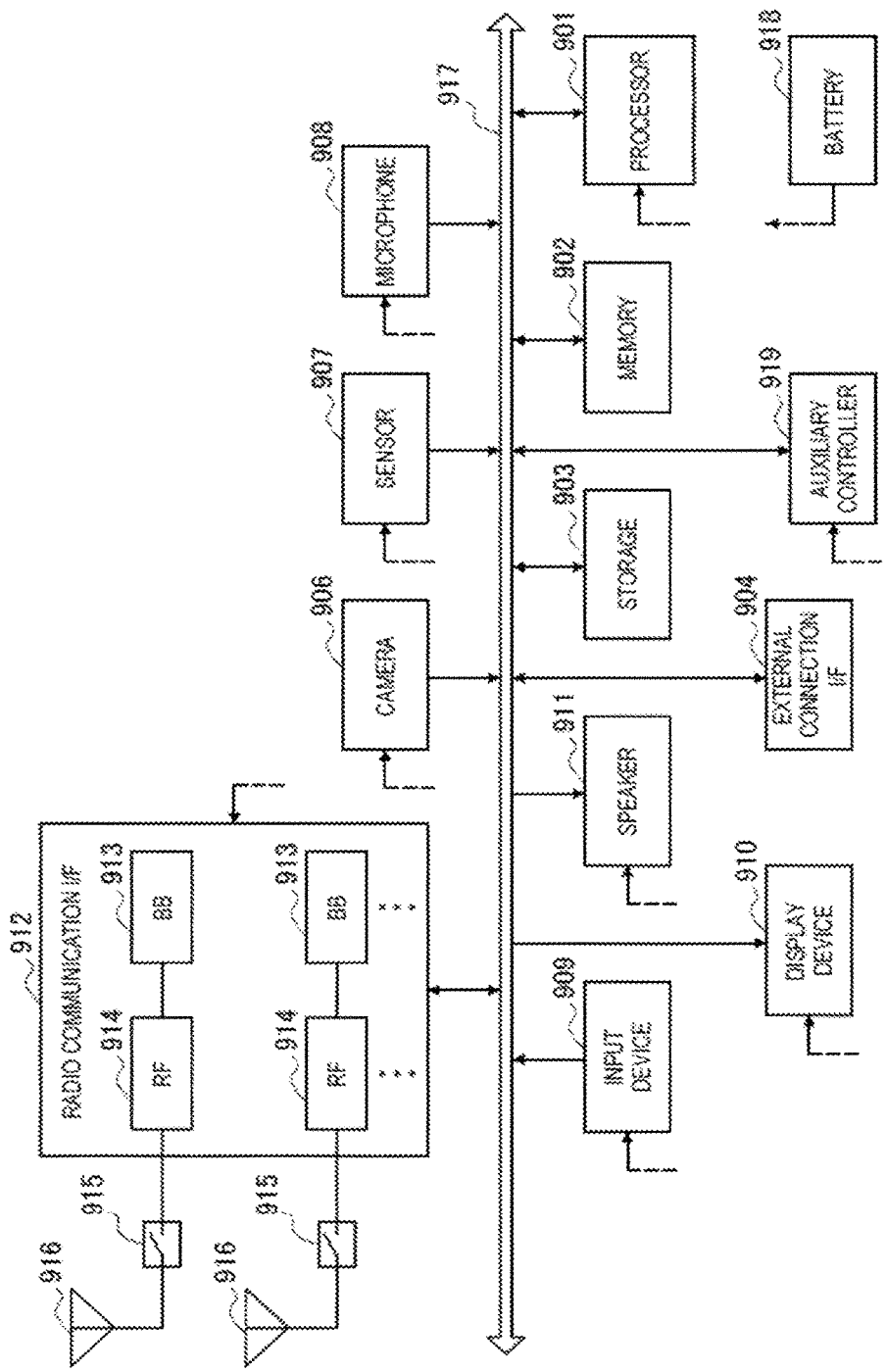
FIG. 14 is a block diagram of an example of a schematic configuration of a smart phone to which the technology of the present disclosure may be applied.

FIG. 14 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen (such as a liquid crystal display (LCD) and an organic light-emitting diode (OLED) display), and displays an output image of the smartphone 900. The speaker 911 converts audio signals that are output from the smartphone 900 to sounds.

The radio communication interface 912 supports any cellular communication scheme (such as LET and LTE-Advanced), and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may be a one chip module having the BB processor 913 and the RF circuit 914 integrated thereon. The radio communication interface 912 may include the multiple BB processors 913 and the multiple RF circuits 914, as illustrated in FIG. 14. Although FIG. 14 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 14. Although FIG. 14 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 14 via feeder lines, which are partially shown as dashed lines in the figure. The auxiliary controller 919 operates a minimum necessary function of the smartphone 900, for example, in a sleep mode.

In the smartphone 900 illustrated in FIG. 14, the transceiving unit 203 described with reference to FIG. 6 may be implemented by the radio communication interface 912. At least a part of the functions may also be implemented by the processor 901 or the auxiliary controller 919. For example, the processor 901 or the auxiliary controller 919 can perform the determination of whether the uplink scheduling grant being capable of being valid by performing functions of the energy detecting unit 201 and the determining unit 202.

Second Application

Figure 15:
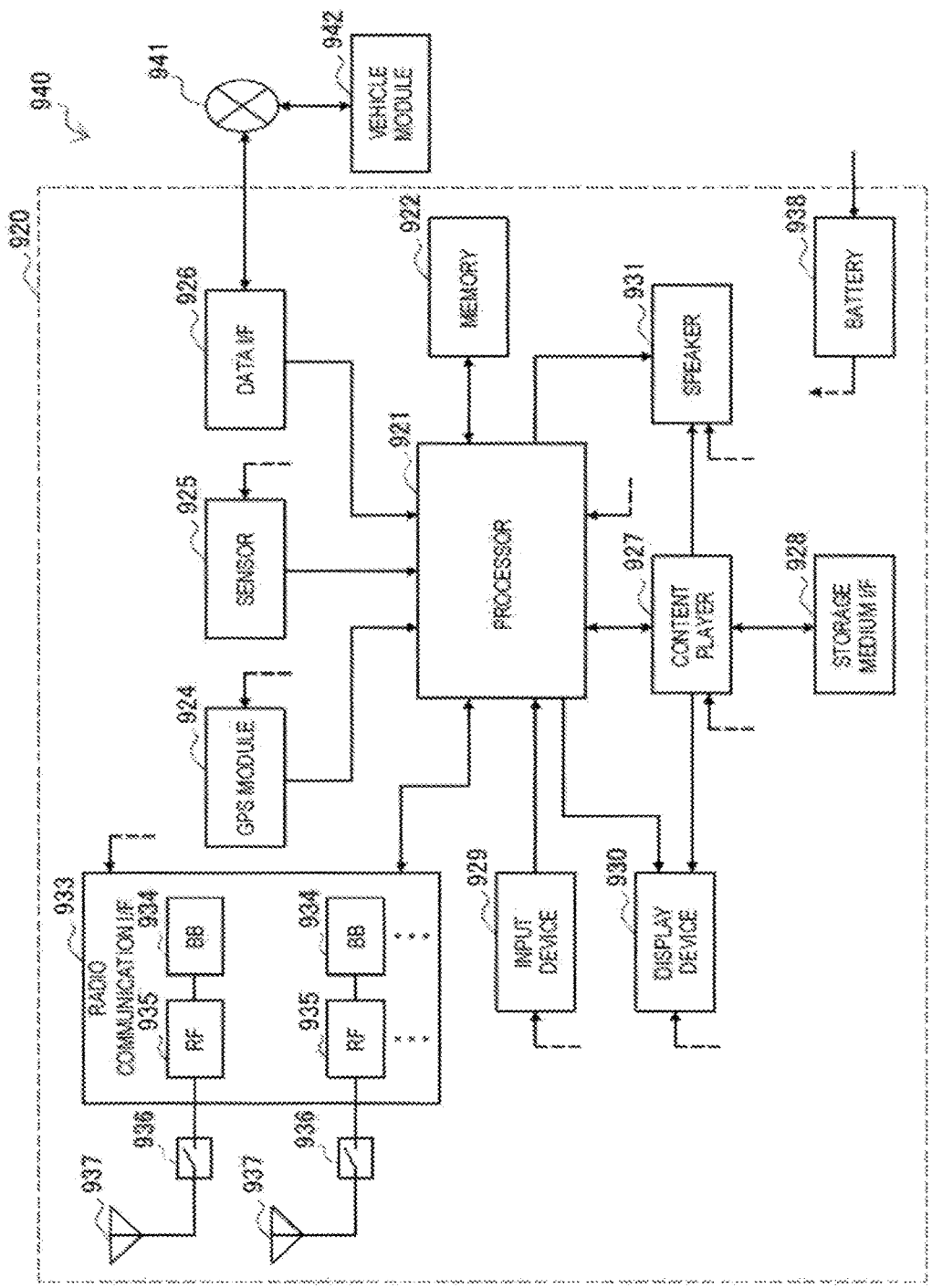
FIG. 15 is a block diagram of an example of a schematic configuration of a car navigation device to which the technology of the present disclosure may be applied.

FIG. 15 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle (such as vehicle speed data).

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme (such as LTE and LTE-Advanced), and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may also be a one chip module that has the BB processor 934 and the RF circuit 935 integrated thereon. The radio communication interface 933 may include the multiple BB processors 934 and the multiple RF circuits 935, as illustrated in FIG. 15. Although FIG. 15 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 15. Although FIG. 15 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 15 via feeder lines that are partially shown as dashed lines in the figure. The battery 938 accumulates power supplied form the vehicle.

In the car navigation apparatus 920 illustrated in FIG. 15, the transceiving unit 203 described with reference to FIG. 6 may be implemented by the radio communication interface 933. At least a part of the functions may also be implemented by the processor 921. For example, the processor 921 can perform the determination of whether the uplink scheduling grant being capable of being valid by performing functions of the energy detecting unit 201 and the determining unit 202.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data (such as vehicle speed, engine speed, and trouble information), and outputs the generated data to the in-vehicle network 941.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and using of their general circuit designing knowledge or general programming skills.

It can be understood by those skilled in the art that, in the apparatus described above, the setting unit, the generating unit, the energy detecting unit, the determining unit and the like can be implemented by one or more processors, and the transceiving unit and the like can be implemented by circuit elements such as an antenna, a filter, a modem, a codec and the like.

Therefore, an electronic device (1) is further provided in the present disclosure, which includes a circuit, configured to: set, for multiple user equipment, different priority levels for the user equipment to use uplink transmission resources on an unlicensed frequency band; and generate, for each of the user equipment, an uplink scheduling grant to use the same uplink transmission resources on the unlicensed frequency band, where each uplink scheduling grant contains information of the priority level of the corresponding user equipment.

An electronic device (2) is further provided in the present disclosure, which includes a circuit, configured to: perform energy detection on an unlicensed frequency band, in response to an uplink scheduling grant of uplink transmitting resources on the unlicensed frequency band and which is with respect to user equipment, where the uplink scheduling grant includes information of priority level for the user equipment to use the uplink transmitting resources; and determine, according to the information of the priority level and a result of the energy detection, whether the uplink scheduling grant is valid.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 1600 shown in FIG. 16) from a storage medium or network, where the computer is capable of implementing various functions when installed with various programs.

Figure 16:
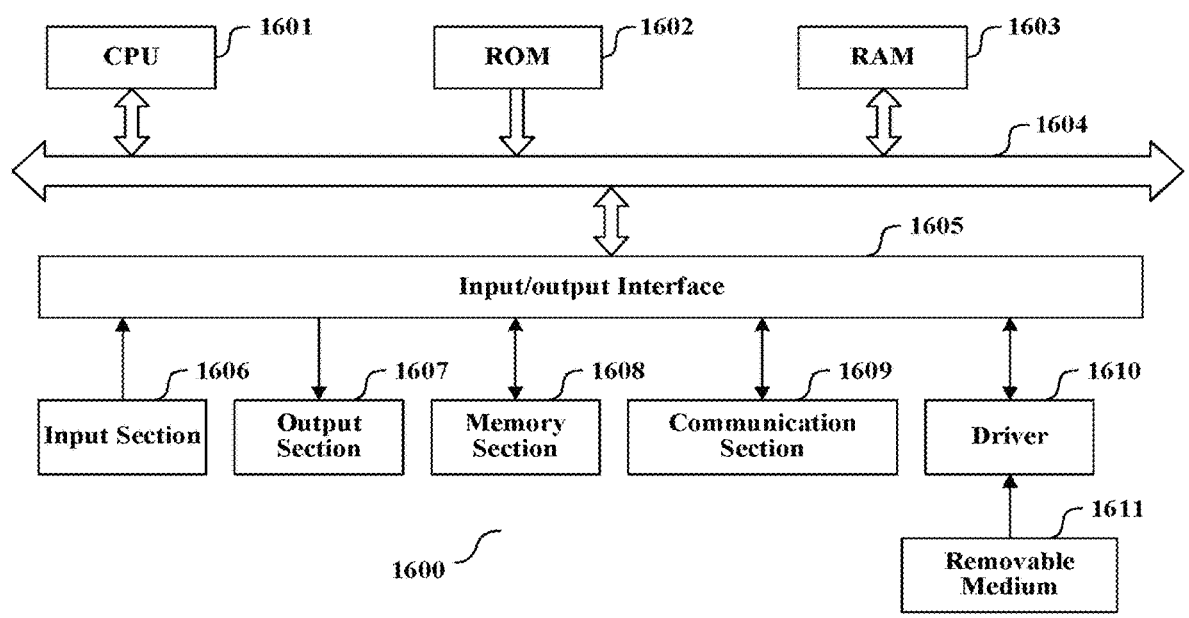
FIG. 16 is a block diagram of an exemplary block diagram illustrating the structure of a general purpose personal computer capable of realizing the method and/or device and/or system according to the embodiments of the present invention.

In FIG. 16, a central processing unit (CPU) 1601 executes various processing according to a program stored in a read-only memory (ROM) 1602 or a program loaded to a random access memory (RAM) 1603 from a memory section 1608. The data needed for the various processing of the CPU 1601 may be stored in the RAM 1603 as needed. The CPU 1601, the ROM 1602 and the RAM 1603 are linked with each other via a bus 1604. An input/output interface 1605 is also linked to the bus 1604.

The following components are linked to the input/output interface 1605: an input section 1606 (including keyboard, mouse and the like), an output section 1607 (including displays such as a cathode ray tube (CRT), a liquid crystal display (LCD), a loudspeaker and the like), a memory section 1608 (including hard disc and the like), and a communication section 1609 (including a network interface card such as a LAN card, modem and the like). The communication section 1609 performs communication processing via a network such as the Internet. A driver 1610 may also be linked to the input/output interface 1605. If needed, a removable medium 1611, for example, a magnetic disc, an optical disc, a magnetic optical disc, a semiconductor memory and the like, may be installed in the driver 1610, so that the computer program read therefrom is installed in the memory section 1608 as appropriate.

In the case where the foregoing series of processing is achieved by software, programs forming the software are installed from a network such as the Internet or a memory medium such as the removable medium 1611.

It should be appreciated by those skilled in the art that the memory medium is not limited to the removable medium 1611 shown in FIG. 16, which has program stored therein and is distributed separately from the apparatus so as to provide the programs to users. The removable medium 1611 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1602 and the memory section 1608 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An apparatus for a user device side of wireless communications, comprising:
processing circuitry configured to:
in response to an uplink schedule grant of uplink transmitting resources on an unlicensed frequency band with respect to the user device, perform energy detecting on the unlicensed frequency band using an energy detection threshold, wherein the uplink schedule grant includes information of a priority level for the user device to make use of the uplink transmitting resources, and
determine, according to the information of the priority level and a result of the energy detecting, whether the uplink schedule grant is valid, wherein the processing circuitry is configured to determine whether the uplink schedule grant is valid according to information of priority level of at least one second user device in the case that the user device does not have the highest priority level and the energy detecting indicates the unlicensed frequency band being idle, and wherein the at least one second user device performs energy detecting in response to other uplink schedule grants for the same uplink transmitting resources and detects that the unlicensed frequency band is idle; and
a transceiver configured to receive information of the uplink schedule grant from a base station side, wherein the transceiver is configured to receive from a primary user device at predetermined time-frequency resources a notification of the uplink schedule grant being valid, wherein the primary user device receives other uplink schedule grants for the same uplink transmitting resources and has the highest priority level, and when the transceiver fails to receive the notification at the predetermined time-frequency resources, the transceiver interchanges with the second user device respective information of priority level, and
wherein the predetermined time-frequency resources are located at the last symbol of a previous sub-frame of a PUSCH sub-frame corresponding to the uplink schedule grant, and
wherein in a case that the notification is transmitted on the unlicensed frequency band and the previous sub-frame of the PUSCH sub-frame is a downlink sub-frame, the downlink sub-frame is configured to be a truncated physical downlink shared channel sub-frame.

2. The apparatus according to claim 1, wherein the processing circuitry is configured to determine that the uplink schedule grant for the user device is valid when all of the at least one second user device have a priority level lower than that of the user device.

3. The apparatus according to claim 2, wherein the transceiver is configured to receive or transmit the notification via D2D communication or via broadcast.

4. The apparatus according to claim 2, wherein the transceiver is further configured to transmit the information of priority level of the user device to the base station.

5. The apparatus according to claim 4, wherein the transceiver is configured to transmit the information of priority level via a PUSCH transmission block.

6. The apparatus according to claim 1, wherein the energy detecting threshold adopted by the processing circuitry when performing the energy detecting is set in one of the following ways: the apparatus is configured to receive the energy detection threshold from the base station side according to a PUSCH transmitting power of the user device, or according to the maximum transmitting power of the user device; or the apparatus is configured to set an energy detection threshold according to a PUSCH transmitting power, according to an actual PUSCH transmitting power, or according to its maximum transmitting power.

7. A wireless communication method for a user device side of wireless communications, comprising:

performing, in response to an uplink schedule grant of uplink transmitting resources on an unlicensed frequency band with respect to the user device, energy detecting on the unlicensed frequency band using an energy detection threshold, wherein the uplink schedule grant includes information of a priority level for the user device to make use of the uplink transmitting resources;

determining, according to the information of the priority level and a result of the energy detecting, whether the uplink schedule grant is valid, wherein the determining of whether the uplink schedule grant is valid is made according to information of priority level of at least one second user device in the case that the user device does not have the highest priority level and the energy detecting indicates the unlicensed frequency band being idle, and wherein the at least one second user device performs energy detecting in response to other uplink schedule grants for the same uplink transmitting resources and detects that the unlicensed frequency band is idle;

receiving, by a transceiver, information of the uplink schedule grant from a base station side; and receiving from a primary user device at predetermined time-frequency resources a notification of the uplink schedule grant being valid, wherein the primary user device receives other uplink schedule grants for the same uplink transmitting resources and has the highest priority level, and when the transceiver fails to receive the notification at the predetermined time-frequency resources, the transceiver interchanges with the second user device respective information of priority level, and wherein the predetermined time-frequency resources are located at the last symbol of a previous sub-frame of a PUSCH sub-frame corresponding to the uplink schedule grant, and wherein in a case that the notification is transmitted on the unlicensed frequency band and the previous sub-frame of the PUSCH sub-frame is a downlink sub-frame, the downlink sub-frame is configured to be a truncated physical downlink shared channel sub-frame.

* * * * *